(No Model.)
J. E. LONERGAN.
LUBRICATOR.
No. 532,469. Patented Jan. 15, 1895.
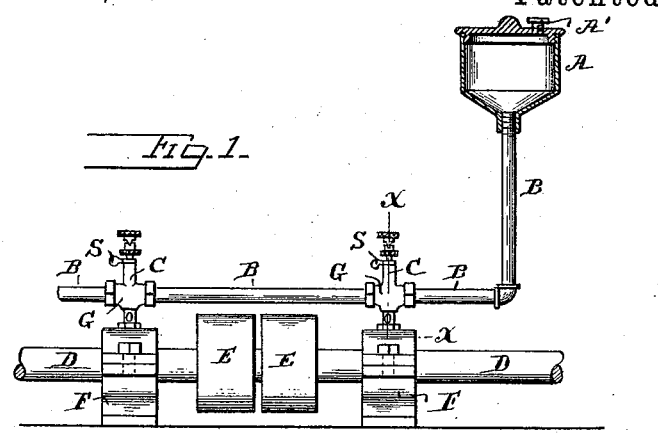
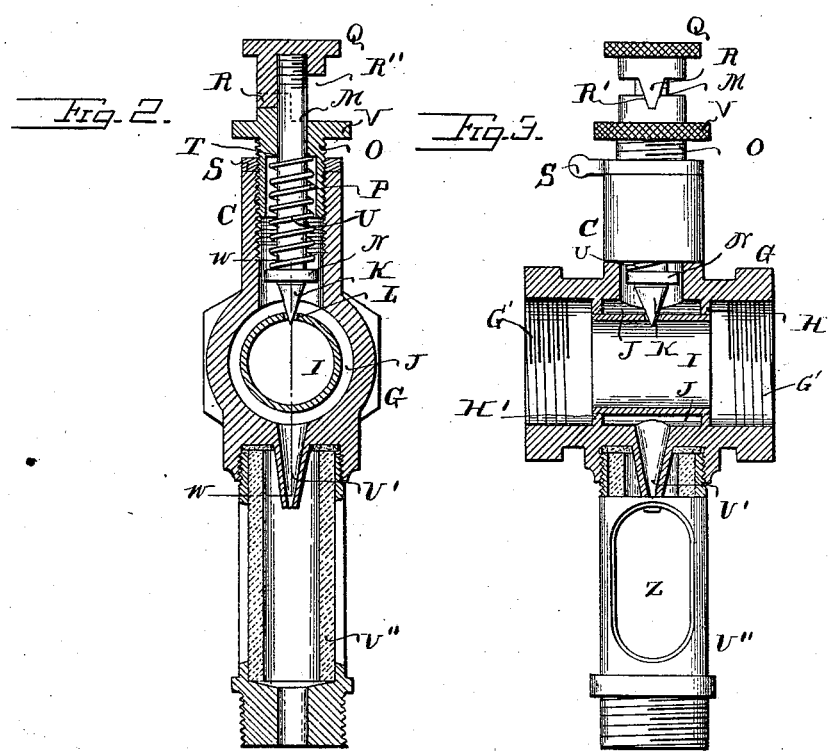
Witnesses:
Jesse B. Heller,
John E. Proul.
Inventor.
John E. Lonergan
per George E. Buckley
his Attorney.

UNITED STATES PATENT OFFICE.

JOHN E. LONERGAN, OF PHILADELPHIA, PENNSYLVANIA.

LUBRICATOR.

SPECIFICATION forming part of Letters Patent No. 532,469, dated January 15, 1895.

Application filed May 18, 1894. Serial No. 511,652. (No model.)

*To all whom it may concern:*

Be it known that I, JOHN E. LONERGAN, a citizen of the United States, and a resident of Philadelphia, Pennsylvania, have invented certain new and useful Improvements in Sight-Feed Lubricators for Bearings, of which the following is a description, reference being had to the annexed drawings, making part hereof.

The nature of my invention will fully appear from the following description and claims.

In the drawings: Figure 1 is a side elevation of my device showing its arrangement, wherein two of my lubricators appear set on an oil conveying tube, oil reservoir, with shafting set in housings and pulleys; Fig. 2, a transverse vertical section of one of my lubricators on the line X X of Fig. 1; Fig. 3, a view partly in elevation and partly in vertical longitudinal section, on the line W W of Fig. 2.

A is the oil reservoir; A', the cap to the same, by the slight raising of which oil is permitted to flow therefrom; B, the oil carrying tube which traverses above the line of shafting and carries the oil, or lubricating material to the lubricators. G G are couplings or boxes set upon the oil tube B and through which the oil passes to lubricate the shaft bearings in housings F F; D, a line of shafting; E E, pulleys.

My lubricators may be used in a series of two, as shown in Fig. 1, or more, at will, or singly upon a bearing the action of a journal, or shafting in which it is desired to ease.

H H' are rings cast integrally in one piece with shell G and projecting inwardly; I, a short tube extending from ring H to ring H'. This tube simply forms an inner shell to create an annular chamber J between itself and the shell of the coupling or box G and from ring H to ring H'. Tube B is in sections set into the lubricator by female screw threads G'. This chamber J, provided with entrance opening through valve seat L and exit teat U' forms a conduit through which a graduated oil supply is carried to the bearing.

K is a conical valve, setting in the correspondingly shaped opening or seat L in the inner shell or short tube I.

M is a stem provided with a lower collar N; O, an outer vertical tube which engages by screw thread P with corresponding screw threads in the interior of tube C of coupling G.

Q is a cap to the stem setting rigidly thereon. As shown in the drawings this cap is screwed upon said stem.

R is a tooth engaging in a corresponding recess or notch R' in the upper edge of tube O.

S is a set-nut engaging by its screw-threads like a collar around tube O and setting down upon the upper rim of tube C. Stem M passes upward freely through the top of tube O.

U is an expansively acting spiral spring setting below upon collar N of stem M and above against shoulder T of tube O. Its action tends to throw valve K down into seat L.

V is a flange upon the upper end of tube O.

U' is a teat, or nozzle to carry an oil drip from chamber J through lower tube U'' to the interior of housing F, wherein is located the bearing to be lubricated, which, in this case, as shown in the drawings, is the bearing of shaft D.

The oil feed is visible through the glass Z. The desired drip or feed of oil is set as follows: Cap A' of reservoir A is slightly raised so as to permit the oil from the latter to supply tube B. Stem M is drawn up and turned by its cap Q and turned and dropped so as to allow tooth R to rest in notch R'. By means of flange V, the tube O is then screwed down into tube C until valve K projects into the opening surrounded by seat L sufficiently to permit the desired regular feed of oil through said opening. The feed having thus been ascertained, the set nut S is turned so as to rest down upon the upper rim of tube C. (See Figs. 2 and 3.) Reservoir A being set above the plane of lubricator G the oil flows from it by gravity through tube B to lubricator G, thence through the open space left in valve seat L beneath valve K, in a graduated feed, into chamber J and downwardly around tube I to teat U'. Thence the oil drops through lower tube U″ upon the bearing in housing F. To arrest the feed, stem M is raised and turned so that tooth R is in space R″, when the stem is released and valve K is allowed to drop into its seat L, thus completely closing the opening in the latter. Short tube I may be soldered into place in rings H H′, or the coupling or box G may be heated and shrunk upon the tube after the latter is inserted. The whole object of chamber J is to provide a conduit for the oil from valve seat L outside the oil supply tube B, to the exit point, or teat U′. By regulating the ingress of air through opening covered by cap A′ the pressure can be so controlled as to permit only the desired drip through the valve seat and chamber J. This air pressure is all which forces the oil upward through seat opening (L) into chamber J whence by gravity it falls to the bearing.

Cap A′ forms a regulator in that it controls the amount of air pressure upon the oil in the reservoir.

It will be observed that tube I forms a continuous passage for the oil in conjunction with tube B; also that reservoir A is simply an enlargement of tube B; also that the opening of valve L is in the upper part of the shell of the tube I. The vertical black line in cap A′, Fig. 1, represents a slot or split into the interior which is hollow, closed above. It is thus apparent that by raising, or lowering this cap more or less air is admitted through it.

It will be observed that the tube I forms a wall, between which and the shell of the box, or coupling the chamber J is left for the flow of the lubricant. Other devices for forming this chamber will suggest themselves to the minds of skilled mechanics. Therefore in my claims I shall speak of this chamber being formed between, or surrounded by walls, which are here those I of the inner tube and G of the coupling or box G.

What I claim as new is—

1. In a lubricator, the combination of reservoir A; oil feed tube B; connected therewith and conducting the lubricant therefrom; box or coupling G and tube I with space or chamber J between them the upper part of tube I being pierced with valve seat opening L, valve K and oil exit U′, all combined and operating substantially as described.

2. In a lubricator the combination of oil feed tube B; tube I, provided in its upper part with opening L; valve K, seating in said opening; coupling G, and a conduit leading from said seat opening to the exit point U′ for the oil to the bearing; whereby the overflow of oil through opening L may be regulated and conducted to the bearing to be lubricated, substantially as described.

3. In a lubricator the combination of reservoir A; air supply regulator A′; feed tube B; tube I; box, or coupling G; the upper part of tube I being pierced with an opening L, the walls of said tube I and coupling G forming a conduit leading from said opening outside the pierced tube, adapted to carry oil to the lower, or exit end of said conduit, whence the oil drips to the bearing to be lubricated, substantially as described.

In witness that the above is my invention I have hereunto set my hand this 2d day of May, A. D. 1894.

JOHN E. LONERGAN.

Witnesses:
   GEORGE E. BUCKLEY,
   W. A. NEWTON.